US012585605B2

(12) United States Patent
Kapre et al.

(10) Patent No.: US 12,585,605 B2
(45) Date of Patent: Mar. 24, 2026

(54) COARSE GRAINED RECONFIGURABLE ARCHITECTURE

(71) Applicant: XILINX, INC., San Jose, CA (US)

(72) Inventors: Nachiket Ganesh Kapre, Singapore (SG); Kimon Karras, Athens (GR); Dmitri Kitariev, Newport Beach, CA (US); Neil Duncan Turton, Cambridge (GB); Siddhartha, Singapore (SG); Stephan Diestelhorst, Cambridge (GB); Thilini Kaushalya Bandara Dassanayake Mudiyanselage, Singapore (SG)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/080,604

(22) Filed: Dec. 13, 2022

(65) Prior Publication Data

US 2024/0193117 A1     Jun. 13, 2024

(51) Int. Cl.
*G06F 13/40* (2006.01)
*G06F 7/57* (2006.01)

(52) U.S. Cl.
CPC ............ *G06F 13/4045* (2013.01); *G06F 7/57* (2013.01); *G06F 13/4022* (2013.01)

(58) Field of Classification Search
CPC .. G06F 9/3828; G06F 9/30036; G06F 9/3001; G06F 9/382; G06F 13/4045; G06F 13/4022; G06F 7/57; G06F 15/8046
See application file for complete search history.

(56) References Cited

U.S. PATENT DOCUMENTS

| | | | |
|---|---|---|---|
| 10,645,029 B1 * | 5/2020 | Watson | ................... H04L 47/33 |
| 11,082,364 B2 | 8/2021 | Pope et al. | |
| 2005/0099841 A1 | 5/2005 | Mukund et al. | |
| 2022/0413803 A1 * | 12/2022 | Parra | ................... G06F 15/8046 |
| 2022/0413924 A1 * | 12/2022 | Parra | ......................... G06T 1/20 |
| 2022/0414054 A1 * | 12/2022 | Parra | ..................... G06F 9/3828 |

OTHER PUBLICATIONS

Sivaraman, A, et al., "Packet Transactions: High-Level Programming for Line-Rate Switches," SIGCOMM '16: Proceedings of the 2016 ACM SIGCOMM Conference, Aug. 2016, pp. 15-28.
International Search Report and Written Opinion from PCT/US2023/034052 dated Jan. 22, 2024.

* cited by examiner

*Primary Examiner* — Ernest Unelus
(74) *Attorney, Agent, or Firm* — Patterson + Sheridan, LLP

(57) ABSTRACT

Embodiments herein describe a configurable packet processing architecture for a SmartNIC or other network device. The configurable architecture includes a plurality of PPEs which are communicatively coupled using a packet bus. A packet can be processed in each of the PPEs. For example, each packet may be first processed by PPE 1, then PPE 2, then PPE 3, and so forth. Moreover, the results of processing the packet at a PPE 1 may affect the operation performed on the packet when it reaches PPE 2 or PPE 3. Thus, the PPEs form a chain where the results determined by a first PPE when processing the packet can affect or change the operation a second PPE performs when processing the same packet.

18 Claims, 6 Drawing Sheets

300

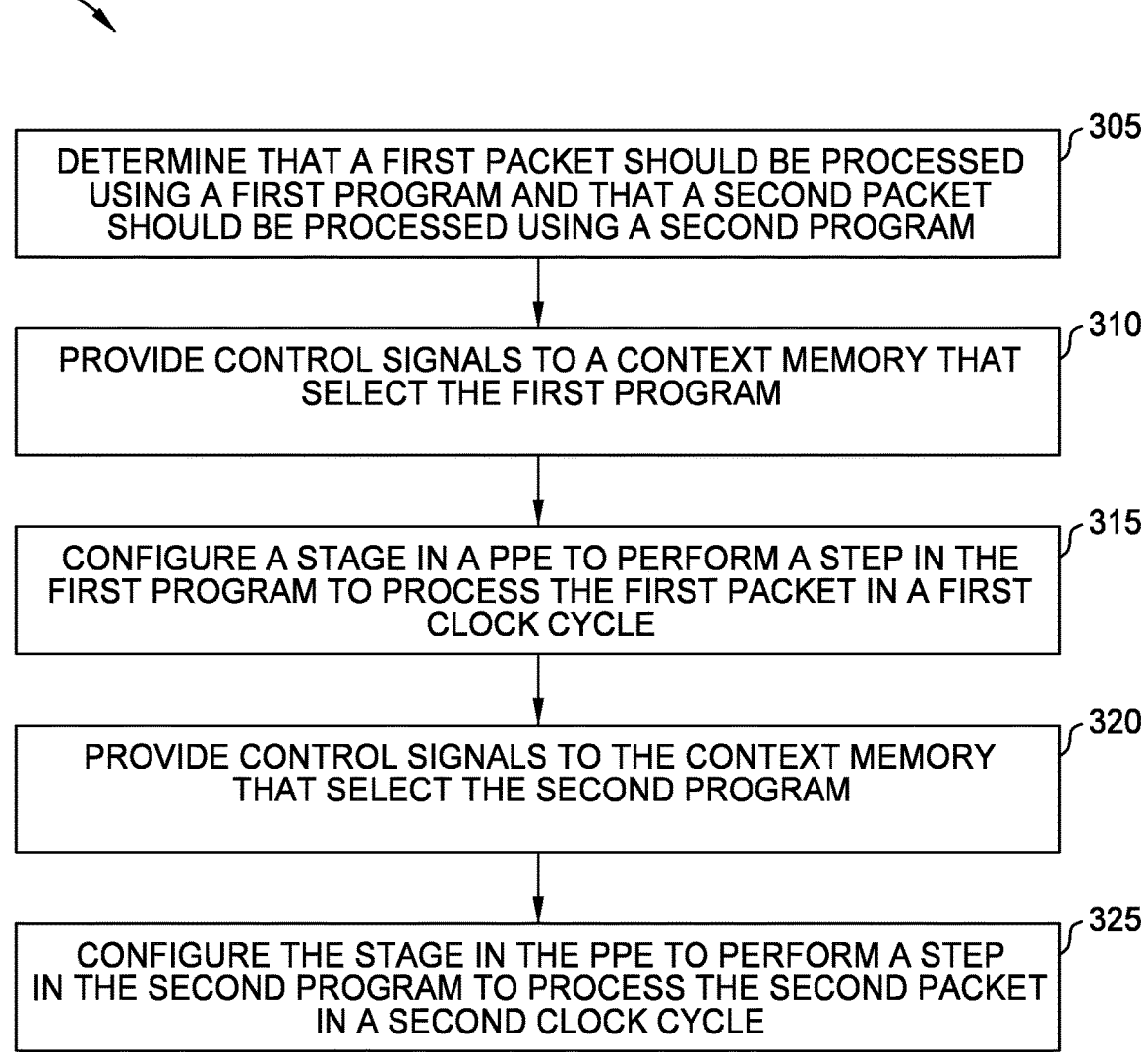

305
DETERMINE THAT A FIRST PACKET SHOULD BE PROCESSED USING A FIRST PROGRAM AND THAT A SECOND PACKET SHOULD BE PROCESSED USING A SECOND PROGRAM

310
PROVIDE CONTROL SIGNALS TO A CONTEXT MEMORY THAT SELECT THE FIRST PROGRAM

315
CONFIGURE A STAGE IN A PPE TO PERFORM A STEP IN THE FIRST PROGRAM TO PROCESS THE FIRST PACKET IN A FIRST CLOCK CYCLE

320
PROVIDE CONTROL SIGNALS TO THE CONTEXT MEMORY THAT SELECT THE SECOND PROGRAM

325
CONFIGURE THE STAGE IN THE PPE TO PERFORM A STEP IN THE SECOND PROGRAM TO PROCESS THE SECOND PACKET IN A SECOND CLOCK CYCLE

FIG. 3

COARSE GRAINED RECONFIGURABLE ARCHITECTURE

TECHNICAL FIELD

Examples of the present disclosure generally relate to programmable packet processing engines (PPEs) in a network device (e.g., a Smart Network Interface Card (Smart-NIC)).

BACKGROUND

In recent years, SmartNICs have been increasingly used to process packets before the packets are forwarded to the host's processing complex (e.g., before the packets are processed by the host's central processing units (CPUs)). To do so, SmartNICs often have their own processors or engines which process the packets. The SmartNIC can either have processors or engines that perform a single task—e.g., perform only certain type of packet processing process—or are programmable so they can perform multiple packet processing processes. The advantage of processors that perform only one task is they are much faster and require less real estate than processors that are programmable to perform multiple tasks. The advantage of processors that are programmable is that they are flexible and can process multiple types of packets. However, programmable processors are slow, and thus, the SmartNIC can become a bottleneck. It is desired to have flexible (e.g., programmable) PPEs in a SmartNIC that can perform multiple different tasks but has high throughput (e.g., can process one packet per cycle).

SUMMARY

One example is an SmartNIC that includes a plurality of packet processing engines (PPEs) where each of the plurality of PPEs includes circuitry that forms a plurality of stages and where the plurality of stages is configured to process different packets in parallel. The SmartNIC also includes a packet bus interconnecting the plurality of PPEs to form a chain where the packet bus is configured to pass a packet to be processed by each of the plurality of PPEs along the chain.

One example described herein is an integrated circuit that includes a plurality of PPEs each comprising a plurality of stages where each of the plurality of stages comprises ALUs that are reconfigurable to perform different functions when processing different packets. The integrated circuit also includes a packet bus interconnecting the plurality of PPEs to form a chain where the packet bus is configured to pass a packet to be processed by each of the plurality of PPEs along the chain.

One example described herein is a method that includes determining, using a first PPE in an integrated circuit (IC), that a first packet should be processed using a first program and that a second packet should be processed using a second program; providing control signals to a context memory for a second PPE in the IC that select the first program; configuring, using outputs of the context memory, a first stage in the second PPE to perform a first step in the first program to process the first packet in a first clock cycle; providing control signals to the context memory that select the second program; and reconfiguring, using the outputs of the context memory, the first stage in the second PPE to perform a first step in the second program to process the second packet in a second clock cycle.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 3 is a flowchart for programming a stage in a PPE to execute different packet processing programs, according to one example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
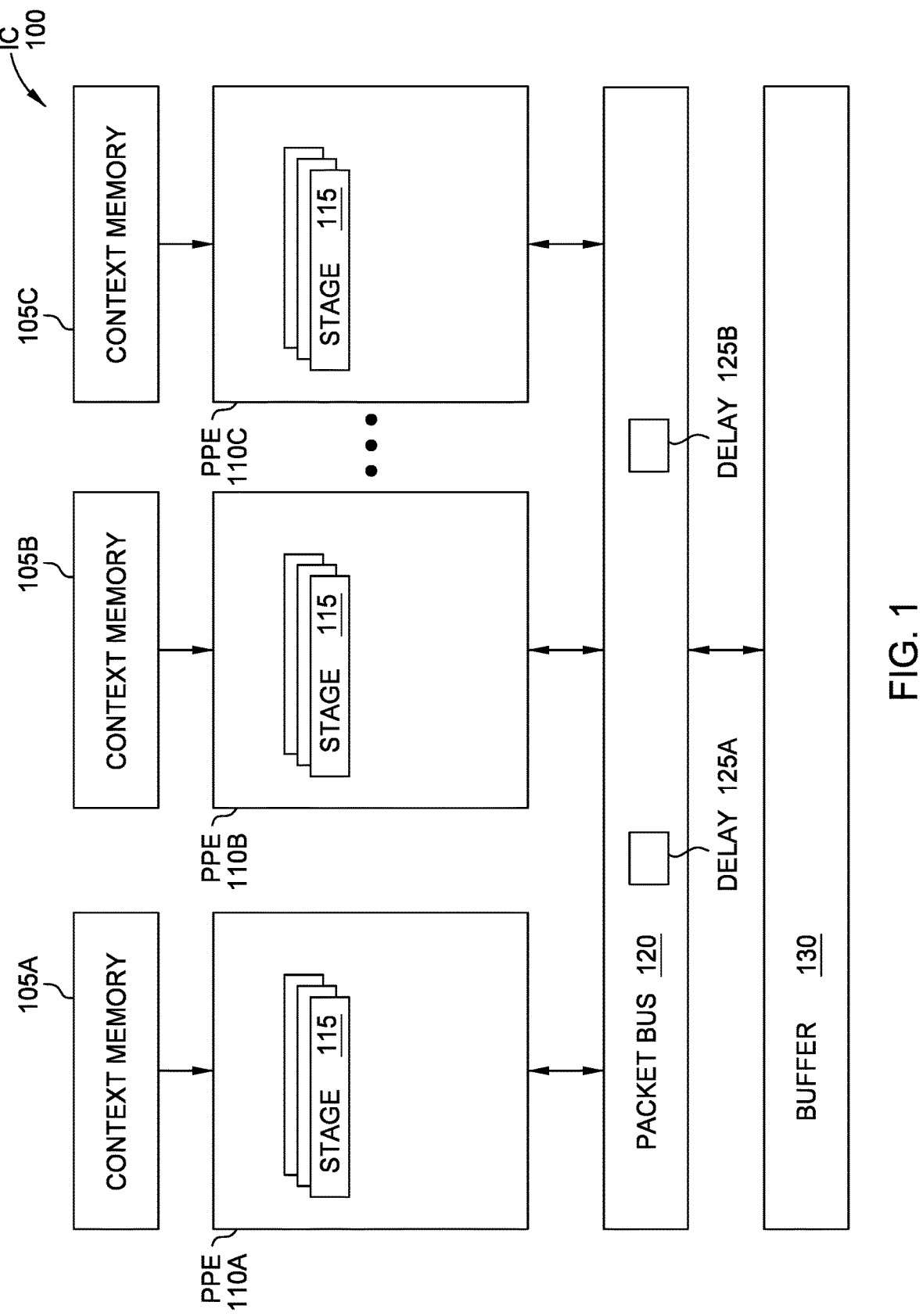
FIG. 1 is a block diagram of an integrated circuit with configurable packet processing architecture, according to one example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a configurable packet processing architecture for a SmartNIC or other network device. The configurable architecture includes a plurality of PPEs which is communicatively coupled to a packet bus. A packet can be processed in each of the PPEs. For example, each packet may be first processed by PPE 1, then PPE 2, then PPE 3, and so forth. Moreover, the results of processing the packet at a PPE 1 may affect the operation performed on the packet when it reaches PPE 2 or PPE 3. Thus, the PPEs form a chain where the results determined by an upstream PPE when processing the packet can affect or change the operation a downstream PPE performs when processing the same packet.

In addition, each PPE can include multiple stages formed from processing circuitry (e.g., arithmetic logic units (ALUs)) and switches. The functions performed by the ALUs in each stage can be controlled by a respective context memory. The context memory can receive control signals which indicate which packet processing program should be used to process the current packet. The outputs of the context memory can configure the ALUs in that stage to perform the process. In the next clock cycle, the context memory can receive different control signals which select a different program. The output of the context memory reconfigure the ALUs in the stage to process a second packet according to the different program. The stages in the PPEs can be pipelined so that each stage in the PPE performs a different packet process on a different packet each clock cycle. Thus, the PPEs can support non-deterministic packet processing where the results generated by one PPE can be used to control how a downstream PPE processes the packet as well as per packet processing using stages in the PPEs that can be reconfigured for each packet.

FIG. 1 is a block diagram of an integrated circuit (IC) 100 with configurable packet processing architecture, according to one example. In one embodiment, the IC 100 is part of a networking device or component that receives packets from a network. In one embodiment, the IC 100 is a SmartNIC. SmartNICs (also referred to as Data Processing Units (DPUs)) are adept at converging offload acceleration in one component, and also offer a cloud vendor a way to manage virtualization and security where multiple cloud tenants concurrently use this common, pervasive infrastructure.

The IC 100 includes a plurality of PPEs 110 that are interconnected using a packet bus 120. In one embodiment, packets are received and stored at a buffer 130. The packet bus 120 then retrieves a packet from the buffer 130 and inserts it into a first PPE (e.g., PPE 110A). In one embodiment, the packet bus 120 retrieves only a portion of the packet from the buffer 130. For example, the PPEs 110 may process only portions of the packet (e.g., a sub-portion of the fields in the header) but not other parts of the packet such as the remaining fields in the header or the data payload. Thus, the packet bus 120 may only read out a portion of the packet from the buffer 130. As such, when describing processing a packet using the PPEs 110, this can include processing the entire packet or processing only a portion of the packet.

After the first PPE is finished processing a packet, the packet bus 120 then routes the packet to the next PPE (e.g., PPE 110B). However, rather than routing the packet to the next PPE in the next clock cycle, the packet bus 120 includes delays 125 between the PPEs. For example, the packet may be delayed a set number of clock cycles after exiting the PPE 110A before being transmitted to the PPE 110B by the packet bus 120. In one embodiment, the delay 125 may be set such that the IC 100 has time to perform a read or write to the buffer 130 before the packet is processed by the PPE 110B. For example, when processing a particular field in the packet at PPE 110A, it may determine that a read should be performed to retrieve additional data from the packet that is stored in the buffer 130. That is, only a portion of the packet may have been processed by the PPE 110A which then determines additional data should be retrieved from the buffer (e.g., retrieve a different field in the packet's header). The delay 125A provides time for the packet bus 120 to perform a read or write to the buffer 130 before the packet is then transmitted to the next PPE 110. In one embodiment, the packet bus 120 includes a delay 125 between each of the PPEs. The system may know the time used to perform a read or write to the buffer 130, and thus, can set the delays 125 to a corresponding cycle count.

In addition to instructing the packet bus 120 to perform read and writes, the PPEs 110 can also determine how downstream PPEs 110 process the packet. For example, the PPE 110A may determine when processing the packet whether it is a IPv4 or IPv6 packet. The PPEs 110B and 110C may perform different functions depending on this information. As shown, each of the PPEs 110 have a context memory 105 which can reconfigure (or program) the PPEs 110 to perform different functions. If the PPE 110A determines the packet is an IPv4 packet, it can send control signals to the context memories 105B and 105C that control how the PPEs 110B and 110C process the packet. If the PPE 110A determines the packet is an IPv6 packet, the PPE 110A can send different control signals to the context memories 105B and 105C which result in the PPEs 110B and 110C processing the packet differently. Using the context memories 105 to configure or program the PPEs will be discussed in more detail in FIG. 2.

Each PPE 110 includes stages 115 for processing multiple packets in parallel. That is, each stage 115 in a PPE 110 can process a different packet in parallel with the other stages 115 in the same PPE 110. Moreover, in one embodiment, the stages 115 may process a different packet each clock cycle. Thus, the PPEs 110 can receive and output a packet every clock cycle and can process multiple packets simultaneously using the stages 115.

In one embodiment, the context memories 105 configure or program each of the stages 115 to perform different tasks. For example, when processing a first packet during a first clock cycle, the context memory 105A can configure a first stage 115 in the PPE 110A to perform a first task on the first packet (e.g., a multiply and add). During the next clock cycle, the context memory 105A can reconfigure the first stage 115 to perform a second task on a second packet (e.g., a shift and bit mask). In this manner, the stages 115 can be flexibly reconfigured or reprogrammed every clock cycle to perform different functions on the packets. Thus, the PPEs 110 can support multiple different packet processing programs as well as have high throughput (e.g., output a packet every clock cycle).

In one embodiment, the packet bus 120 forms the PPEs 110 into a chain where received packets are processed by each PPE 110. For example, the received packets may first be processed by PPE 110A, then PPE 110B, then PPE 110C, and so forth. The packet bus 120 forms the interconnect between the PPEs 110 so that the received packets can be processed by each PPE 110 in the chain.

Figure 2:
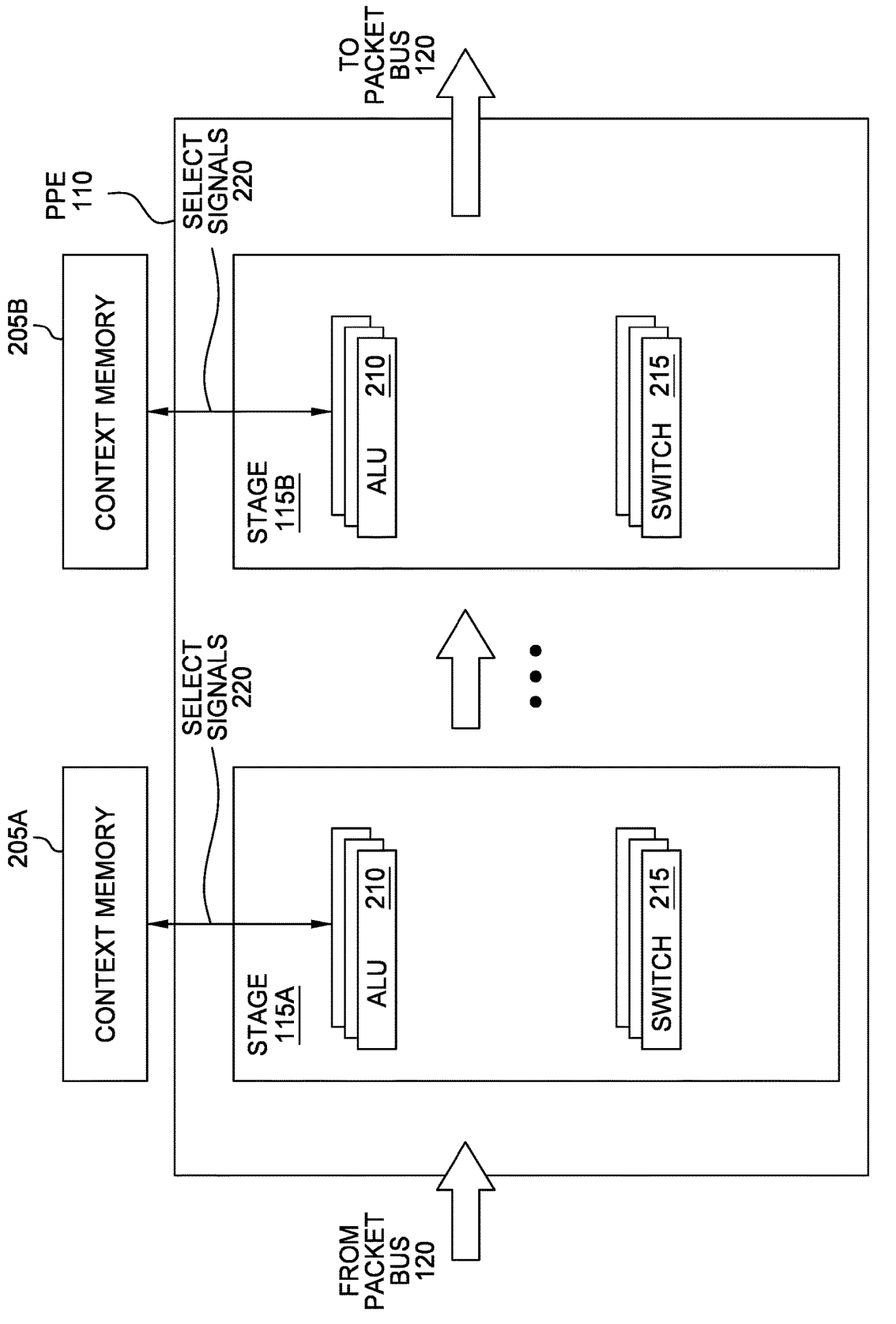
FIG. 2 is a block diagram of a programmable PPE in a configurable packet processing architecture, according to one example.

FIG. 2 is a block diagram of a programmable PPE 110 in a configurable packet processing architecture, according to one example. As shown, the PPE 110 receives packets from the packet bus 120 which is provided to a first stage 115A. Each of the stages 115 includes a plurality of ALUs 210 and switches 215. The ALUs 210 are configurable to perform multiple different processing tasks (e.g., mathematical or logical operations) such as adds, subtract, multiplies, bit shifts, bit masks, logical operations, etc. Moreover, each stages 115 corresponds to a respective context memory 205. That is, the context memory 105 in FIG. 1 can include a context memory 205 for each of the stages 115 in the PPE 110.

The context memories 205 can use select lines 220 which configure or program the ALUs 210 in the respective stage. In some embodiments, the ALUs 210 are programmed using the extended Berkely Packet Filter (eBPF) or the P4 programming languages. That is, the instruction sets of the ALUs 210 may be customized for packet processing instructions as used in the eBPF or P4 programming languages.

Although not shown, the context memories 205 can receive control signals that indicate a particular program that should be used to process the current packet. The control signals can be used to index into the context memories 205 to identify the corresponding select lines 220 which are then provided to the ALU 210. In this manner, the ALUs 210 can be reconfigured or reprogrammed each clock cycle for a different packet. However, the embodiments herein are not limited to ALUs 210, and any data processing circuit can be used such as processors, data processing engines, and the like.

The stages 115 also include switches 215 which couple the outputs of the ALUs 210 in the current stage 115 to the inputs of the ALUs 210 in the subsequent stage 115. Put differently, the switches 215 interconnect the stages 115 so that the packets can progress through the stages 115.

In one embodiment, a packet may pass through a stage 115 without being processed. For example, for some packet processing programs, the PPE 110 may have completed the corresponding tasks using previous stages 115. When passing through the remaining stages 115 in the PPE 110, the packet may be passed through "dummy" ALUs in the stages 115.

Once a packet has passed through the stages 115, the PPE 110 transmits the packet to the packet bus 120. The packet bus 120 can then perform any read and writes (if the PPE 110 determined it should) and transmit the packet to the next PPE.

FIG. 3 is a flowchart of a method 300 for programming a stage in a PPE to execute different packet processing programs, according to one example. At block 305, a PPE determines that a first packet should be processed using a first packet processing program and that a second packet should be processed using a second packet processing program. For example, this determination may have been made when the first and second packets were processed by an upstream PPE. For example, the upstream PPE may have determined the first packet is a IPv4 packet while the second packet is a IPv6 packet. The first program may be performed on IPv4 packets while the second program is performed on IPv6 packets. The downstream PPEs can then process the two packets differently using the two programs.

At block 310, the upstream PPE (or some other hardware circuitry in the IC) provides control signals to a context memory that selects the first program. It is assumed the context memory is in a downstream PPE that is currently processing the first packet at a first stage. For example, the first packet may have already been processed by the upstream PPE which is then providing the control signals to the downstream PPE for processing the first packet.

At block 315, the context memory configures the stage in the downstream PPE to perform a step in the first program to process the first packet in a first clock cycle. For example, the context memory may configure the ALUs in the first stage to perform a bit shift on the first packet, which is one step in the first program.

At block 320, the upstream PPE (or some other hardware circuitry in the IC) provides different control signals to the context memory that select the second program. Because the stage is going to process the second packet in the next cycle, the control signals can be synchronized so that the context memory can reconfigure the ALUs in the stage to process the second packet.

At block 325, the context memory configures the stage in the PPE to perform a step in the second program to process the second packet in a second (next) clock cycle. For example, the context memory may reconfigure the ALUs in the first stage to perform an add and a multiply on the second packet, which is one step in the second program.

In this manner, the PPE can dynamically change the packet processing function being performed at each stage at each clock cycle. This change can be based on a determination performed by an upstream PPE or some other means. For example, the program can be selected from the context memory using a particular field in the first packet to index into the context memory. The field could have been analyzed in a previous stage in the PPE and the results could be used as a control signal for a subsequent stage (or stages) in the PPE to select a program.

Although not described in FIG. 3, the method 300 could continue where, as the first packet progresses through the stages in the PPE, the control signals are updated so that the context memories for those stages configure the ALUs to perform the next steps in the first program. For example, the second stage in the PPE could perform the second step of the first program, the third stage in the PPE could perform the third step of the first program, and so forth. That is, the context memory can configure the second stage in the PPE to perform the second step in the first program to process the first packet in the second clock cycle in parallel with processing the second packet in the first stage of the PPE. The context memory can then reconfigure the second stage in the PPE to perform a second step in the second program to process the second packet in a third clock cycle.

Moreover, as the first packet is processed by other PPEs, these PPEs can also perform additional steps of the first program, or can be controlled to process the first packet using different programs (e.g., depending on the results of processing the first packet using the first program).

When initializing the SmartNIC, the context memories can be loaded with data regarding the different packet processing programs that can be used. Thus, during runtime, the context memories can have the necessary data for configuring the ALUs in the stages.

Figure 4:
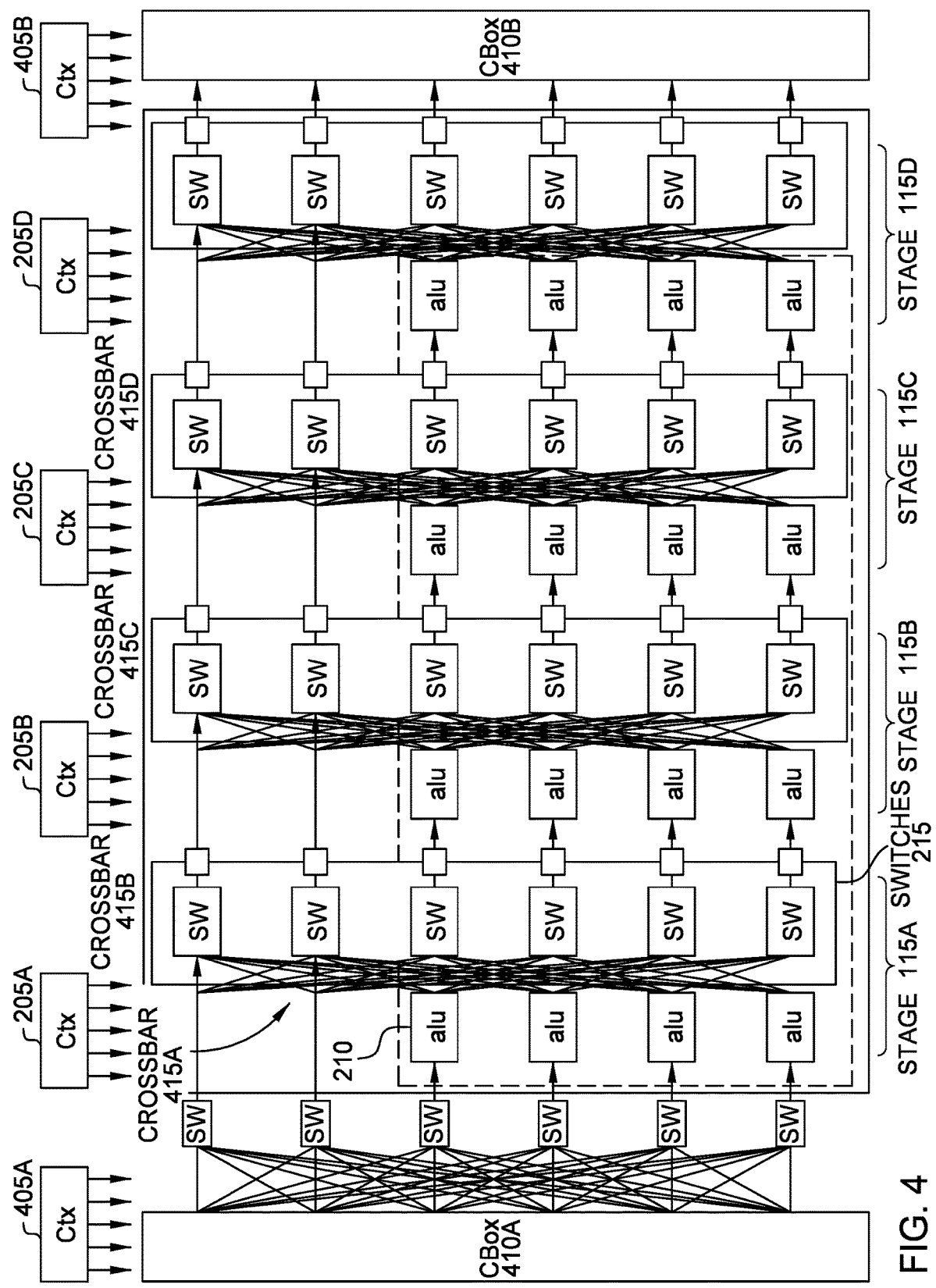
FIG. 4 is a block diagram of a programmable PPE, according to one example.

FIG. 4 is a block diagram of a programmable PPE 400, according to one example. That is, the PPE 400 can be one implementation of the PPE 110 illustrated in FIGS. 1 and 2.

The PPE 400 includes four stages 115A-D, but this is just one example and the PPE 400 can have any number of stages. Each stage 115 includes a corresponding context memory 205 for configuring or programming the ALUs 210 as discussed above. Moreover, the ALUs 210 in each stage are coupled to every switch 215 in the same stage using a crossbar 415. In one embodiment, the crossbar 415 connects every ALU 210 in the stage 115 to every switch 215 in the same stage 115. The switches 215 are then coupled to a respective one of the ALUs 210 in the next stage 115. However, the reverse could also be performed where the ALUs 210 in the stage are coupled to only one of the switches 215 in the same stage 115. A crossbar could then be used to connect each of the switches 215 to every one of the ALUs 210 in the next stage 115. In either case, the output of an ALU 210 in one stage can be routed to any of the ALUs 210 in the next stage.

Further, FIG. 4 illustrates data paths in the stages 115 that do not include ALUs. As mentioned above, a packet may pass through a stage 115 without being processed. Thus, some data paths through the stage may not include ALUs or may include "dummy" ALUs. In FIG. 4, the two top data paths through the stages 115 do not contain ALUs or may contain dummy ALUs, while the four bottom data paths of the stages 115 include ALUs that perform packet operations.

FIG. 4 also illustrates connection boxes (CBOXes) 410 (e.g., switches) that couple the PPE 400 to the packet bus. That is, the CBOX 410A and 410B are part of the packet bus 120 in FIG. 1. The CBOX 410A can be used to insert or transmit packets to the first stage 115A of the PPE 400 while the CBOX 410B receives the packet from the last stage 115D of the PPE 400. The functions of the CBOXes 410 are described later in FIG. 6.

Also, FIG. 4 illustrates context memories 405 for the CBOXes 410. The CBOXes 410 can be configured or programmed using the context memories 405. The context memories 405 can program the switch control signals for the CBOXes 410. In one embodiment, the CBOXes 410 have an internal switching matrix (black circles in FIG. 6) that route data to the correct input going into the ALU clusters. Each switch (black circle, or a 2:1 mux) is programmed to decide if it is going to choose that particular input to route to that particular output. A multiplexer select signal, e.g., switch control, can be supplied statically from the context memory 405. Thus, a compiler can produce not only the instructions going to the ALU but also programming information for the switching functions performed by the CBOXes 410.

Figure 5:
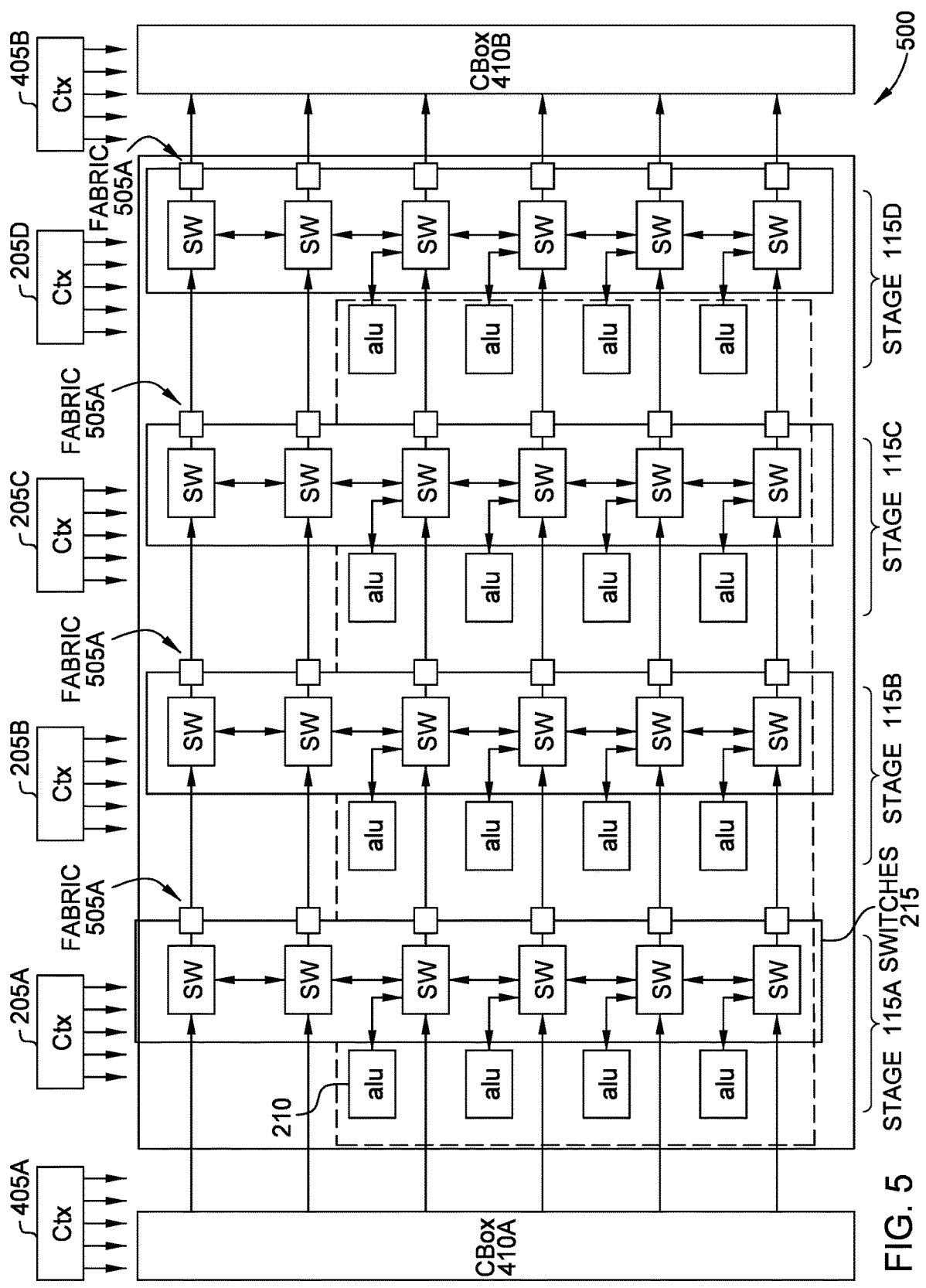
FIG. 5 is a block diagram of a programmable PPE, according to one example.

FIG. 5 is a block diagram of a programmable PPE 500, according to one example. That is, the PPE 400 can be one implementation of the PPE 110 illustrated in FIGS. 1 and 2.

The PPE 500 includes four stages 115A-D, but this is just one example and the PPE 500 can have any number of stages. Like in FIG. 4, each stage 115 includes a corresponding context memory 205 for configuring or programming the ALUs 210 as discussed above. However, unlike in FIG. 4, the ALUs 210 in each stage are coupled to only one switch 215 in the same stage. In one embodiment, a mesh routing fabric 505 (e.g., a unidirectional mesh routing fabric) can be used by the switches 215 to route data from one stage to the ALUs 210 in the next stage. The routing fabric 505 may also provide optional buffers to retime the interconnect.

The remaining portions of the PPE 500 are the same as the PPE 400.

Figure 6:
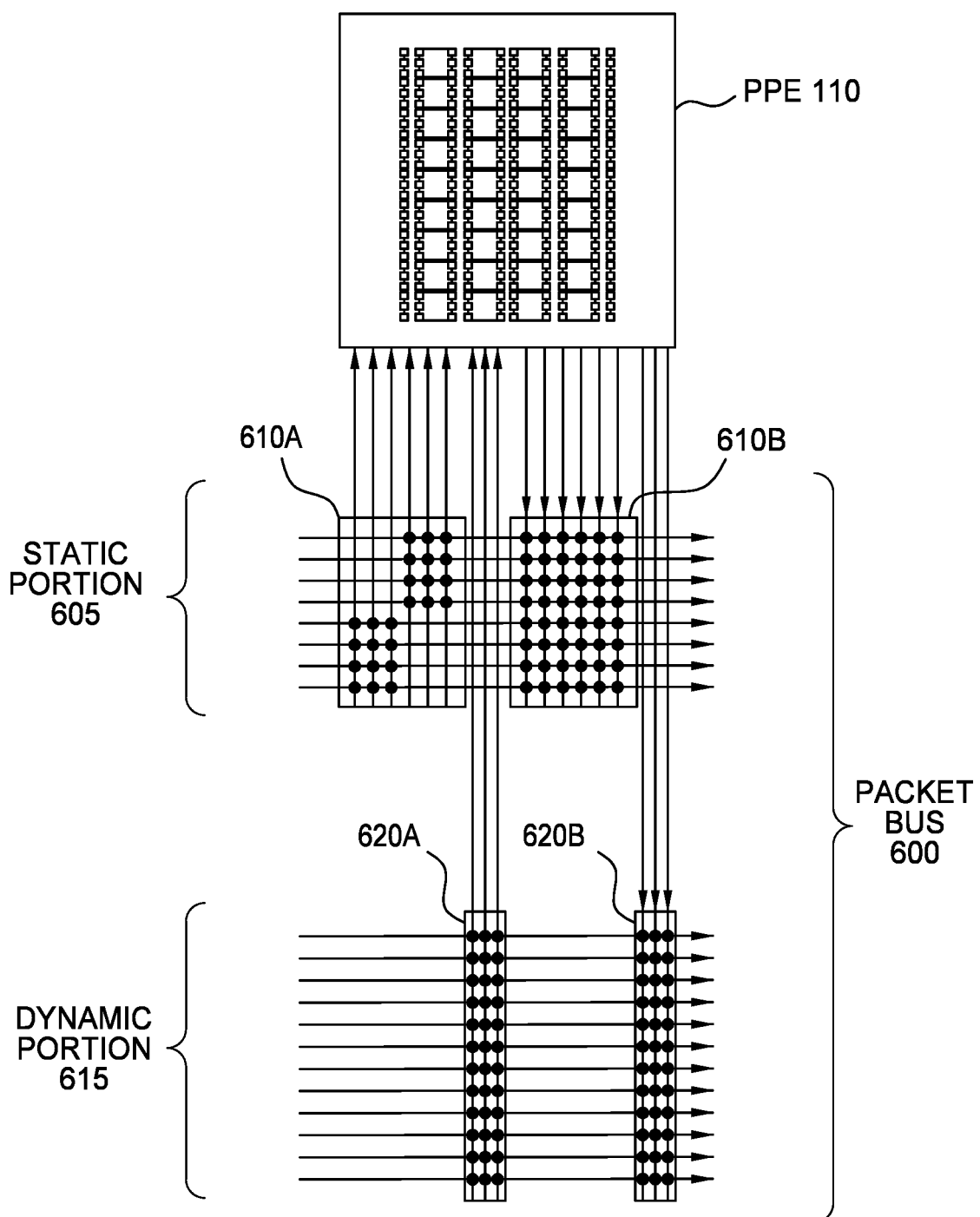
FIG. 6 is a block diagram of a packet bus in a configurable packet processing architecture, according to one example.

FIG. 6 is a block diagram of a packet bus 600 in a configurable packet processing architecture, according to one example. The packet bus 600 can be one portion of the packet bus 120 illustrated in FIG. 1.

The packet bus 600 is coupled to the PPE 110, which can include either of the implementations shown in FIG. 4 or FIG. 5. The packet bus 600 includes a static portion 605 and a dynamic portion 615. The static portion 605 has CBOXes 610 (three in this example) which serve as intermediate memory between the PPEs 110. In one embodiment, the CBOXes 610 in the static portion 605 of the bus 600 store updated values of the fields, which are calculated by the PPEs 110. For example, as part of processing a packet, the PPE 110 can calculate a new value for a field in the packet. However, the new value may be an intermediate data value for the field. It may be a job for a downstream PPE 110 to calculate the final, new value for the field in the packet. The CBOXes 610 provide memory for an intermediate data value calculated by a first PPE 110 to be transmitted to an downstream PPE 110 so it can continue to process the value until it (or other downstream PPEs) determine the final value for the field in the packet. Thus, the static portion 605 of the packet bus 600 can serve as a scratch pad for the PPE 110 so they can transmit intermediate data values to downstream PPEs.

In one embodiment, the dynamic portion 615 of the bus 600 includes CBOXes 620 (two in this example) that store the current data in the packet. For example, once the PPEs 110 determine a new, final value for a field, this value can be stored in the dynamic portion 615 of the bus 600 thereby replacing the old value for this field in the packet header. Thus, the dynamic portion 615 can transmit the current data in the packets to each of the PPEs.

In addition, the dynamic portion 615 of the bus 600 can be connected to the buffer 130 in FIG. 1 to permit the PPEs 110 to perform reads and writes. For example, if the dynamic portion 615 stores only some of the fields of a first packet, and the PPE 110 determines that another field of the first packet needs to be retrieved, the dynamic portion 615 can fetch that field from the buffer 130 (e.g., perform a read) and store the additional field. Thus, when requested by a downstream PPE, the dynamic portion 615 can provide the data from the retrieved field to the PPE since this data is now stored in the CBOXes 620.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A Smart network interface card (SmartNIC), comprising:

a plurality of packet processing engines (PPEs), wherein each of the plurality of PPEs comprises circuitry that forms a plurality of stages, wherein the plurality of stages allows individual PPEs to process different packets in parallel;

a plurality of context memories corresponding to the plurality of PPEs; and a packet bus interconnecting the plurality of PPEs, wherein the plurality of PPEs are sequenced to form a chain, wherein the packet bus is configured to pass a packet to be processed by each of the plurality of PPEs along the chain, wherein the plurality of PPEs comprises a first PPE and at least a second PPE that is downstream from the first PPE in the chain, wherein the first PPE is configured to, during a first clock cycle, process the packet according to a first processing program of a plurality of packet processing programs, and to provide, based on the processing, control signals separate from the processed packet to a plurality of context memories corresponding to different downstream PPEs of the plurality of PPEs, the different downstream PPEs including the second PPE, and wherein the control signals:

indicate a second processing program, of the plurality of packet processing programs, to use to further process the processed packet at the second PPE, and configure the circuitry of at least the second PPE to perform functions of the second processing program on the processed packet during a second clock cycle, and wherein the first processing program and the second processing program are different programs performing active functions.

2. The SmartNIC of claim 1, wherein the plurality of context memories are configured to reconfigure the plurality of stages to perform different functions.

3. The SmartNIC of claim 2, wherein each of the plurality of context memories is configured to program a first stage of the plurality of stages in a respective PPE to perform a first function when processing a first packet and reconfigure the first stage to perform a second function when processing a second packet.

4. The SmartNIC of claim 3, wherein the first packet is processed by the first stage in a first clock cycle and the second packet is processed by the first stage in a next clock cycle.

5. The SmartNIC of claim 2, wherein each of the plurality of stages comprises a plurality of arithmetic logic units (ALUs) and switches, wherein the switches couple the ALUs in their own stage to the ALUs in a subsequent stage, and wherein the ALUs are programmed by the plurality of context memories to perform the different functions.

6. The SmartNIC of claim 1, further comprising:
   a delay between each of the plurality of PPEs, wherein a time of the delay is set to enable the packet bus to perform a read or write to a buffer in response to a first PPE of the plurality of PPEs processing a first packet before a second PPE of the plurality of PPEs begins to process the first packet.

7. The SmartNIC of claim 1, wherein the plurality of PPEs and the packet bus are on a same integrated circuit.

8. An integrated circuit (IC), comprising:
   a plurality of packet processing engines (PPEs) each comprising a plurality of stages, wherein each of the plurality of stages comprises arithmetic logic units (ALUs) that are reconfigurable to perform different functions when processing different packets; and
   a packet bus interconnecting the plurality of PPEs, wherein the plurality of PPEs are sequenced to form a chain, wherein the packet bus is configured to pass a packet to be processed by each of the plurality of PPEs along the chain,
   wherein a first PPE of the plurality of PPEs is configured to, during a first clock cycle, process the packet according to a first processing program of a plurality of packet processing programs, and to provide, based on the processing, control signals separate from the processed packet to a plurality of context memories corresponding to different downstream PPEs of the plurality of PPEs,
   wherein the control signals:
      indicate, to a second PPE of the downstream PPEs, a second packet processing program, of the plurality of packet processing programs, to use to further process the processed packet, and
      configure the ALUs of at least the second PPE to perform functions of the second processing program on the processed packet during a second clock cycle, and
   wherein the first processing program and the second processing program are different programs performing respective functions.

9. The IC of claim 8, wherein each of the plurality of stages comprises switches for interconnecting the ALUs in their own stage to the ALUs in a subsequent stage.

10. The IC of claim 9, wherein the switches use a crossbar to interconnect two subsequent stages.

11. The IC of claim 9, wherein the switches use a mesh routing fabric to interconnect two subsequent stages.

12. The IC of claim 8, wherein each of the plurality of context memories is configured to program a first stage of the plurality of stages in a respective PPE to perform a first function when processing a first packet and reconfigure the first stage to perform a second function when processing a second packet.

13. The IC of claim 12, wherein the first packet is processed by the first stage in a first clock cycle and the second packet is processed by the first stage in a next clock cycle.

14. The IC of claim 8, further comprising:
   a delay between each of the plurality of PPEs, wherein a time of the delay is set to enable the packet bus to perform a read or write to a buffer in response to a first PPE of the plurality of PPEs processing a first packet before a second PPE of the plurality of PPEs begins to process the first packet.

15. The IC of claim 8, wherein the packet bus comprises a static portion configured to store and transmit intermediate data values between the plurality of PPEs and a dynamic portion configured to store and transmit data in the different packets between the plurality of PPEs.

16. A method, comprising:
   determining, using a first packet processing engine (PPE) in an integrated circuit (IC), to process a first packet using a first program and to process a second packet using a second program, wherein the first program and the second program are different programs performing respective functions;
   providing, from the first PPE, first control signals separate from the first packet to a plurality of context memories corresponding to different downstream PPEs in the IC, wherein the first control signals indicate the first program from a plurality of packet processing programs;
   configuring, using outputs of the context memory corresponding to a second PPE, a first stage in the second PPE to perform a first step in the first program to process the first packet in a first clock cycle;
   providing second control signals separate from the second packet to the plurality of context memories that indicate the second program from the plurality of packet processing programs; and
   reconfiguring, using the outputs of the context memory corresponding to the second PPE, the first stage in the second PPE to perform a first step in the second program to process the second packet in a second clock cycle,
   wherein the first and second PPEs are part of a chain of PPEs interconnected by a packet bus, wherein the first and second packets are processed by every PPE in the chain of PPEs.

17. The method of claim 16, further comprising:
   configuring, using the outputs of the context memory, a second stage in the second PPE to perform a second step in the first program to process the first packet in the second clock cycle in parallel with processing the second packet in the first stage; and
   reconfiguring, using the outputs of the context memory, the second stage in the second PPE to perform a second step in the second program to process the second packet in a third clock cycle.

18. The method of claim 16, wherein the outputs of the context memory are used to configure a plurality of arithmetic logic units (ALUs) in the first stage to perform the first step of the first program and the first step of the second program.

* * * * *